(12) United States Patent
Nishikawa et al.

(10) Patent No.: US 8,344,687 B2
(45) Date of Patent: Jan. 1, 2013

(54) BATTERY PACK UPDATING METHOD

(75) Inventors: Toru Nishikawa, Sumoto (JP); Atsushi Kawasumi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 365 days.

(21) Appl. No.: 12/707,139

(22) Filed: Feb. 17, 2010

(65) Prior Publication Data

US 2010/0213891 A1 Aug. 26, 2010

(30) Foreign Application Priority Data

Feb. 20, 2009 (JP) .................................. 2009-38085

(51) Int. Cl.
*H02J 7/00* (2006.01)
*G01N 27/416* (2006.01)
(52) U.S. Cl. ......... 320/106; 320/130; 320/132; 324/427
(58) Field of Classification Search ................. 320/106, 320/132; 324/427
See application file for complete search history.

(56) References Cited

U.S. PATENT DOCUMENTS

| | | | | |
|---|---|---|---|---|
| 5,767,659 A | * | 6/1998 | Farley | 320/106 |
| 5,784,633 A | * | 7/1998 | Petty | 710/60 |
| 6,664,764 B1 | * | 12/2003 | Odaohhara | 320/132 |
| 6,771,491 B2 | | 8/2004 | Tojo et al. | |
| 6,828,761 B1 | * | 12/2004 | Suzuki et al. | 320/132 |
| 6,943,525 B2 | * | 9/2005 | Toya et al. | 320/104 |
| 7,579,811 B2 | * | 8/2009 | Sato et al. | 320/134 |
| 2005/0013604 A1 | * | 1/2005 | Ogawa | 396/279 |
| 2008/0294988 A1 | * | 11/2008 | Nicholas et al. | 715/710 |

FOREIGN PATENT DOCUMENTS

| | | |
|---|---|---|
| JP | 2001-275270 | 10/2001 |
| JP | 2002-33824 | 1/2002 |
| JP | 2008-71149 | 3/2008 |

* cited by examiner

*Primary Examiner* — M'Baye Diao
(74) *Attorney, Agent, or Firm* — Wenderoth Lind & Ponack, L.L.P.

(57) ABSTRACT

A battery pack updating method updates firmware stored in internal control circuit memory via an update signal sent from a main device that supplies power. When battery pack memory is updated, an AC adapter is connected to the main device, and power is supplied to the main device from the AC adapter. The updating method transmits a charging and discharging blocking signal from the main device to the battery pack control circuit via a communication line. The charging and discharging blocking signal stops discharge from the battery pack rechargeable battery, and stops charging of the rechargeable battery. With rechargeable battery discharging and charging to and from the main device stopped by the charging and discharging blocking signal, the updating method transmits update data from the main device to the battery pack control circuit to update memory.

20 Claims, 4 Drawing Sheets

BATTERY PACK UPDATING METHOD

BACKGROUND OF THE INVENTION

1. Field of the Invention

The present invention relates to a method of updating firmware stored in battery pack memory with that battery pack attached to a main device such as a microcomputer.

2. Description of the Related Art

A battery pack that supplies electric power to a device such as a laptop microcomputer is provided with memory to store firmware that controls rechargeable battery charging and discharging. By controlling rechargeable battery charging and discharging with firmware stored in memory, battery pack safety can be improved and rechargeable battery degradation can be reduced. Battery pack firmware is loaded into memory in a process step at the factory. However, the factory loaded firmware is not always the ideal code. If the firmware is less than ideal, detrimental effects such as reduced battery safety or reduced battery life can result. To prevent these types of detrimental effects, apparatus and methods for updating battery pack firmware have been developed.

Refer to Japanese Laid-Open Patent Publications Nos. 2008-71149, 2001-275270, and 2002-33824.

SUMMARY OF THE INVENTION

In JP2008-71149A, battery voltage is detected when the firmware of the battery powered device is updated. When battery voltage is within a relatively low preset voltage range, the firmware is updated with the main device operating in a low-power mode to restrain battery voltage decrease. If battery voltage is below a minimum voltage, firmware update is prohibited. This updating method can prevent interruption of the update due to battery voltage decrease in mid-operation. However, it has the drawback that it cannot always stably perform firmware update.

In JP2001-275270A, battery pack firmware is stored in rewritable memory such as flash memory. The firmware is updated in response to some abnormality, or when it is necessary to improve functionality. When battery pack firmware is updated, the firmware is obtained from the internet or a memory medium and transferred to the battery pack via the System Management Bus (SMBus) of the main device. The battery pack firmware stored in rewritable flash memory is replaced with the revised firmware. This method also has the drawback that it cannot always stably update the battery pack firmware.

In JP2002-33824A, a method for preventing system destruction in mobile telephones is cited. System destruction can be caused by incomplete data writing due to an unexpected power-down associated with battery consumption during communication via Bluetooth wireless technology. This disclosure can be summarized as follows. At the start of, and during Bluetooth communication, the remaining battery capacities of the transmitting (master) mobile phone and the receiving (slave) mobile phone are monitored (detected with a given period during communication) and controlled by the master. If the detected remaining battery capacities are greater than or equal to a predetermined threshold value, communication is started or continued. Conversely, if a detected remaining battery capacity is below the predetermined threshold value, communication is not performed, or during communication the master ends communication at a safe point in the data stream. With this type of operation, system destruction in a mobile telephone terminal can be prevented in cases such as battery consumption-related power-down in the middle of rewriting program data.

Since this method can perform an update when remaining battery capacity is greater than or equal to a threshold value, it can prevent detrimental effects due to power-down during the update. However, it has the drawback that stable update cannot be performed if remaining battery capacity is below the threshold voltage.

The present invention was developed with the object of correcting the drawbacks described above. Thus, it is an important object of the present invention to provide a battery pack updating method that can always stably update battery pack firmware regardless of the remaining capacity or voltage of the battery housed inside. It is another important object of the present invention to provide a battery pack updating method, which by accurate remaining battery capacity detection, can properly control battery charging and discharging even directly after firmware update.

The first aspect of the battery pack updating method of the present invention updates firmware stored in a rewritable fashion in internal control circuit 21 memory 24 via an update signal sent from a main device 1 that supplies power. When battery pack 2 memory 24 is updated, an AC adapter 3 is connected to the main device 1, and power is supplied to the main device 1 from the AC adapter 3. The updating method transmits a charging and discharging blocking signal from the main device 1 to the battery pack 2 control circuit 21 via a communication line 19. The charging and discharging blocking signal stops discharge from the battery pack 2 rechargeable battery 20 to the main device 1 and stops charging of the rechargeable battery 20. With rechargeable battery 20 discharging and charging to and from the main device 1 stopped by the charging and discharging blocking signal, the updating method transmits update data from the main device 1 to the battery pack 2 control circuit 21 to update memory 24.

The battery pack updating method described above has the characteristic that battery pack firmware can always be stably updated regardless of the remaining capacity or voltage of the internal battery. This is because the updating method described above connects an AC adapter to the main device, and the main device is supplied with power from the AC adapter when the battery pack is updated. Further, a charging and discharging blocking signal is transmitted from the main device to the battery pack control circuit via the communication line to stop rechargeable battery discharging and charging to and from the main device. Update data is sent from the main device to the battery pack to update memory with charging and discharging stopped.

Another aspect of the battery pack updating method of the present invention updates firmware stored in a rewritable fashion in internal control circuit 21 memory 24 via an update signal supplied from the main device 1. When battery pack 2 memory 24 is updated, the updating method saves the rechargeable battery 20 remaining capacity and transmits update data from the main device 1 to the battery pack 2 control circuit 21. After battery pack 2 memory 24 is updated, rechargeable battery 20 remaining capacity is over-written with the remaining capacity saved in memory storage.

The method described above has the characteristic that even after update, remaining battery capacity can be accurately detected, and battery charging and discharging can be properly controlled from the time immediately after update using remaining capacity as a parameter. This is because remaining battery capacity is saved prior to update, and after update and reset, remaining battery capacity can be accurately detected using the saved remaining capacity.

In the battery pack updating method of the present invention, when battery pack 2 memory 24 firmware is updated, the battery pack 2 control circuit 21 can be supplied with power from both the rechargeable battery 20 and the AC adapter 3. This method updates control circuit memory firmware while supplying the control circuit with power from both the AC adapter and the rechargeable battery with charging and discharging stopped. Consequently, it has the characteristic that stable control circuit operation can be ensured to more reliably and stably update the firmware. This is because power can be supplied to the control circuit even if either the battery or the AC adapter fails to supply power. For example, if chattering occurs at an AC adapter connector and power is temporarily cut-off, power can be supplied from the battery, which has charging and discharging stopped. Correspondingly, if battery voltage drops temporarily, power can be supplied from the AC adapter.

In the battery pack updating method of the present invention, the battery pack 2 control circuit 21 can be provided with a rechargeable battery 20 protection circuit 22, and this protection circuit 22 can control charging and discharging switches 23 to control rechargeable battery 20 charging and discharging. Since this updating method utilizes battery protection circuit charging and discharging switches to stop charging and discharging during the update, there is no need to provide special purpose switching devices to stop battery charging and discharging. Therefore, firmware can be reliably updated with a simple circuit structure.

In the battery pack updating method of the present invention, the main device 1 can output encrypted firmware to the battery pack 2 to update the battery pack 2 firmware. Since this updating method performs update with encrypted firmware, the firmware can only be updated by the manufacturer and undesirable update by parties such as the user can be prevented.

In the battery pack updating method of the present invention, when the main device 1 updates battery pack 2 firmware, the feasibility for update can be determined at both the main device 1 and the battery pack 2. Since this updating method confirms the feasibility for update at both the main device and the battery pack, battery pack firmware can be updated under positive conditions.

In the battery pack updating method of the present invention, when the main device 1 updates battery pack 2 firmware, battery pack 2 rechargeable battery 20 voltage can be detected, and update can be started if the detected voltage is greater than a minimum voltage. Since this updating method confirms high battery voltage and performs update while supplying power to the control circuit from both the battery and the AC adapter, it can update battery pack firmware in a more stable and reliable manner. This is because even if a condition such as chattering occurs at an AC adapter connector and power cannot be supplied temporarily, power can be stably supplied to the control circuit from the battery.

In the battery pack updating method of the present invention, when the main device 1 updates battery pack 2 firmware, battery pack 2 rechargeable battery 20 remaining capacity can be detected, and update can be started if the detected remaining capacity is greater than a minimum capacity. Since this updating method confirms that remaining battery capacity is greater than a minimum capacity and performs update while supplying power to the control circuit from both the battery and the AC adapter, it can update battery pack firmware in a more stable and reliable manner. This is because even if a condition such as chattering occurs at an AC adapter connector and power cannot be supplied temporarily, power can be stably supplied to the control circuit from the battery.

In the battery pack updating method of the present invention, when the main device 1 updates battery pack 2 firmware, AC adapter connection to the main device 1 can be determined to confirm connection and start the update. Since this updating method confirms AC adapter connection for the update, battery pack firmware can be stably updated with assurance of power supply from the AC adapter to the control circuit.

In the battery pack updating method of the present invention, the main device 1 can be a notebook computer 10. In this updating method, battery pack firmware can be updated by transmitting update data from the notebook computer to the battery pack.

In the battery pack updating method of the present invention, the battery pack 2 rechargeable battery 20 can be a lithium ion battery.

In this updating method, the lithium ion battery can be safely charged and discharged under ideal conditions by operating the control circuit with new revised firmware.

The above and further objects of the present invention as well as the features thereof will become more apparent from the following detailed description to be made in conjunction with the accompanying drawings.

DETAILED DESCRIPTION OF THE INVENTION

Figure 1:
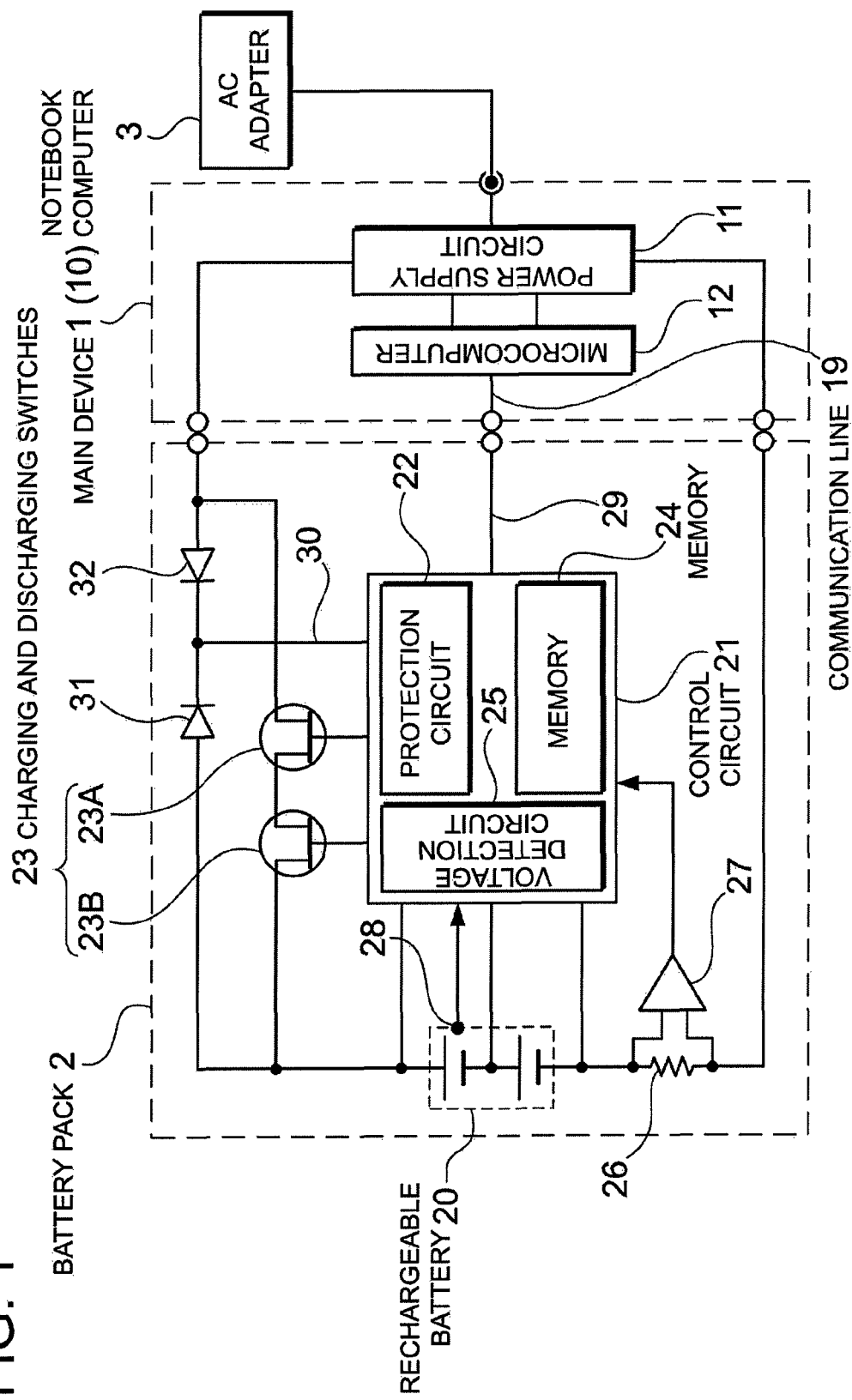
FIG. 1 is a block diagram showing one example of a main device and battery pack used in an embodiment of the updating method of the present invention.

FIG. 1 shows a specific example of a notebook computer 10 as the main device 1. The battery pack 2 is attached to the main device 1 notebook computer 10 to supply power. The main device 1 notebook computer 10 of FIG. 1 is provided with a power supply circuit 11 and a microcomputer 12.

The power supply circuit 11 stabilizes power supplied from the AC adapter 3 and the battery pack 2 and supplies that power to the microcomputer 12. In addition, the power supply circuit 11 converts power supplied from the AC adapter 3 to a current and voltage appropriate for charging the battery pack 2 rechargeable battery 20 and outputs that power to the battery pack 2. Operation of the power supply circuit 11 is controlled by the microcomputer 12.

The microcomputer 12 is connected to the battery pack 2 through the communication line 19. The microcomputer 12 detects battery pack 2 parameters such as voltage, current, and temperature through the communication line 19 to control battery pack 2 charging and discharging. The microcomputer 12 integrates battery pack 2 charging current to compute remaining capacity. Charging capacity is computed from the integrated value of charging current, and discharging capacity is computed from the integrated value of discharging current. Remaining capacity is computed by adding the charging capacity and subtracting the discharging capacity. Further, the microcomputer 12 revises remaining capacity based on the rechargeable battery 20 voltage. This is possible because rechargeable battery 20 voltage becomes a maximum value at full-charge, and becomes a minimum when the battery is completely discharged. The microcomputer 12 controls battery pack 2 charging and discharging based on battery pack 2 remaining capacity and temperature. For example, when the battery pack 2 rechargeable battery 20 becomes fully-charged during battery pack 2 charging with the AC adapter 3 connected to the notebook computer 10, the charging switch 23A is switched OFF to stop charging. Conversely, when remaining capacity drops to a set capacity during battery pack 2 discharging, the notebook computer 10 user is advised that remaining battery capacity is low or that power-down is required. Further, when remaining capacity drops to a minimum remaining capacity, involuntary shutdown is performed to prevent battery pack 2 over-discharging. When the battery temperature in the battery pack 2 exceeds a set temperature, the microcomputer 12 controls the power supply circuit 11 to stop charging and discharging. The microcomputer 12 controls battery pack 2 charging and discharging based on information sent from the battery pack 2. The main device 1 microcomputer 12, which determines rechargeable battery 20 remaining capacity, sends that remaining capacity value to the battery pack 2 via the communication line 19. However, battery pack 2 remaining capacity can also be computed by the battery pack 2 control circuit 21 instead of by the microcomputer 12. In this case, the battery pack 2 computes rechargeable battery 20 remaining capacity by the same method used by the microcomputer 12.

The battery pack 2 is provided with a rechargeable battery 20, a control circuit 21 with a protection circuit 22 that controls rechargeable battery 20 charging and discharging, charging and discharging switches 23 that are controlled ON and OFF by the control circuit 21, and circuitry to detect rechargeable battery 20 voltage and current. The battery pack 2 is connected to the notebook computer 10, which is the main device 1, via the communication line 29.

Primarily, the control circuit 21 is a microcomputer (or microcontroller) provided with memory 24 that stores firmware (software) in a rewritable manner. The control circuit 21 controls battery 20 charging and discharging according to the firmware stored in memory 24, evaluates the condition of the battery 20, and transmits the battery 20 condition to the main device 1 notebook computer 10 via the communication line 29. The control circuit 21 detects battery 20 remaining capacity from parameters such as charging current, voltage, and temperature in accordance with the firmware program. With voltage and temperature as parameters, the control circuit 21 sends battery pack 2 charging and discharging control signals to the main device 1 notebook computer 10. For example, the control circuit 21 stores firmware in memory 24 that controls battery 20 charging and discharging according to battery 20 voltage and temperature. The control circuit 21 controls charging and discharging by operating the charging switch 23A and the discharging switch 23B in accordance with the firmware stored in memory 24. Or, detected battery 20 charging and discharging information is sent to the main device 1 notebook computer 10 in accordance with the stored firmware to control operation at the notebook computer side. Here, the main device 1 notebook computer 10 controls battery 20 charging and discharging based on the charging and discharging information sent from battery pack 2, or the notebook computer 10 displays a low remaining battery 20 capacity message to the user. Further, if rechargeable battery 20 remaining capacity drops to a minimum capacity, the notebook computer 10 powers-down.

The battery pack 2 control circuit 21 detects battery 20 voltage, current, and temperature; and is provided with a protection circuit 22 that controls the charging and discharging switches 23 according to the firmware stored in memory 24. The protection circuit 22 controls the charging and discharging switches 23 to insure safe operation. In this battery pack 2, even if the notebook computer 10 cannot safely protect the battery pack 2, the battery pack 2 control circuit 21 can safely control battery 20 charging and discharging to further improve safety. Consequently, it is preferable for the battery pack 2 control circuit 21 to protect the battery 20 by controlling the charging switch 23A and the discharging switch 23B, and additionally for the main device 1 notebook computer 10 to protect the battery 20 by controlling the charging and discharging switches 23 with charging and discharging information sent from the battery pack 2. However, it is also possible to control and protect the battery 20 with either the battery pack 2 or the main device 1 alone.

The charging and discharging switches 23 control rechargeable battery 20 discharging and charging to and from the main device 1. The charging and discharging switches 23 are made up of a charging switch 23A and a discharging switch 23B connected in series. The charging switch 23A cuts-off charging current but does not cut-off discharging current, while the discharging switch 23B cuts-off discharging current but does not cut-off charging current. The charging switch 23A and the discharging switch 23B are switching devices such as field effect transistors (FETs) that have parasitic diodes or (bipolar) transistors that have diodes connected to allow reverse current flow. The FET or transistor charging switch 23A and discharging switch 23B are controlled ON and OFF by ON-OFF signals applied to their gates or bases by the control circuit 21. Specifically, the charging switch 23A and the discharging switch 23B are switched ON and OFF by the control circuit 21 to control battery 20 discharging and charging to and from the main device 1.

The control circuit 21 detects battery 20 voltage with an internal voltage detection circuit 25 that inputs voltage at the positive and negative electrode terminals of each battery 20 cell. To detect battery 20 current, a current detection resistor 26 is connected in series with the battery 20. The voltage across the current detection resistor 26 is amplified by a difference amplifier 27, and the difference amplifier 27 output is input to the control circuit 21. The control circuit 21 computes battery 20 current with the voltage input from the difference amplifier 27. Since battery 20 current is proportional to the difference amplifier 27 voltage and since the polarity of the difference amplifier 27 output inverts depending on whether the current is charging or discharging current, the control circuit 21 can determine charging current and discharging current from the difference amplifier 27 output.

In addition, a temperature sensor 28 is connected to the control circuit 21 to detect battery 20 temperature. A device that changes electrical resistance with temperature such as a thermistor can be used as the temperature sensor 28. The control circuit 21 determines battery 20 temperature from the electrical resistance of the temperature sensor 28.

Further, the control circuit 21 is provided with memory 24 to store the firmware. The memory 24 stores firmware that computes battery 20 remaining capacity using data such as battery 20 voltage, current, and temperature, and controls charging and discharging depending on battery 20 conditions. The memory 24 is non-volatile memory that can store firmware in a rewritable manner such as flash memory. Further, the control circuit 21 contains a writing circuit (not illustrated) that rewrites the firmware in memory 24 with revised firmware transmitted from the main device 1 via the communication line 29.

The control circuit 21 power line 30 is connected to the battery 20 via a first diode 31, and connected to the main device 1 power supply circuit 11 via a second diode 32. The control circuit 21 can be supplied with power from the battery 20, and can also be supplied with power from the AC adapter 3 connected to the main device 1 notebook computer 10. AC adapter 3 power is supplied to the control circuit 21 through the power supply circuit 11. Since the power line 30 is connected to the battery 20 and the notebook computer 10 power supply circuit 11 via the first diode 31 and the second diode 32, the battery 20 or the power supply circuit 11 power source with the higher voltage supplies power to the control circuit 21 and the power source with the lower voltage does not supply power. To allow battery 20 charging, the output voltage of the power supply circuit 11 is set higher than the battery pack 2 voltage. Therefore, with the AC adapter 3 connected to the notebook computer 10, AC adapter 3 power is supplied to the control circuit 21 after stabilization by the power supply circuit 11. If for some reason, such as AC adapter 3 connector chattering or contact resistance, power cannot be properly supplied to the notebook computer 10 from the AC adapter 3, the control circuit 21 is supplied with power from the battery 20. This circuit structure has the characteristic that when the firmware in memory 24 is rewritten with revised firmware, power supply to the control circuit 21 is assured and the revised firmware can be rewritten in a reliable and stable manner. However, although not illustrated, a circuit structure is also possible that supplies power to the control circuit power line from the AC adapter through the main device notebook computer power supply circuit and not from the battery. This is possible because firmware can be rewritten with AC adapter connection assured.

The battery pack 2 described above is attached to the main device 1 notebook computer 10 and shipped from the factory. Subsequently, if a firmware defect is discovered or it becomes necessary to improve functionality, the firmware can be rewritten with revised firmware. The main device 1 notebook computer 10 reads-in revised firmware from compact disk read-only memory (CDROM), universal serial bus (USB) or an internet line and transmits that firmware via the communication line 19 to the battery pack 2 for update. The battery pack 2 erases the firmware stored in flash memory 24 and writes the revised firmware sent from the main device 1 for firmware update.

Figure 2:
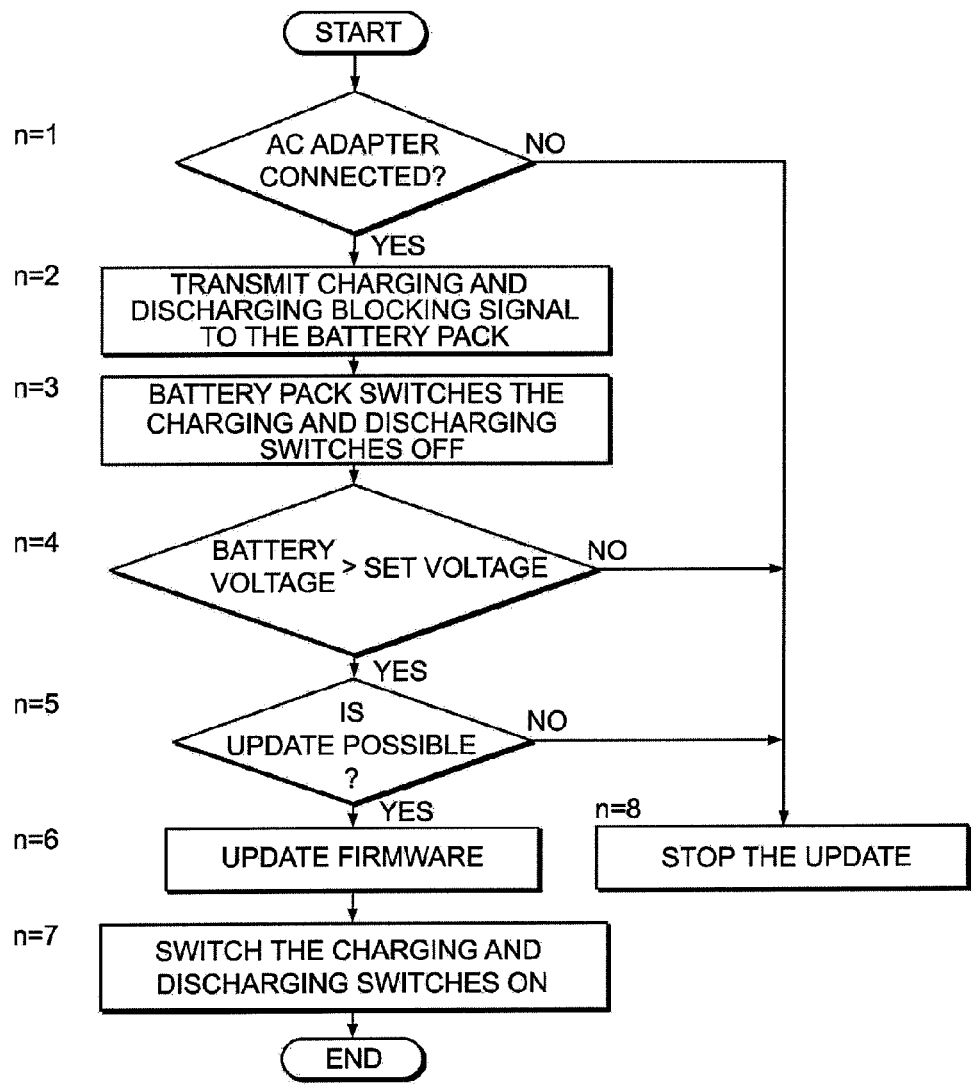
FIG. 2 is a flow-chart showing an embodiment of the battery pack updating method of the present invention.

The firmware stored in battery pack 2 memory 24 is rewritten by the following steps shown in FIG. 2.

[Step n=1]

The main device 1 confirms AC adapter 3 connection. If AC adapter 3 connection to the main device 1 cannot be confirmed, control proceeds to step 8 and firmware update is stopped.

[Step n=2]

If the main device 1 confirms AC adapter 3 connection, the main device 1 transmits a charging and discharging blocking signal to the battery pack 2 via the communication line 19.

[Step n=3]

The battery pack 2 detects the charging and discharging blocking signal and switches the charging and discharging switches 23 OFF. This establishes a state where discharge of the rechargeable battery 20 to the main device 1 is stopped, and battery pack 2 charging from the main device 1 is stopped.

[Step n=4]

The battery pack 2 detects rechargeable battery 20 voltage and compares it to a set voltage. If rechargeable battery 20 voltage is less than or equal to the set voltage, control proceeds to step 8 and firmware update is stopped.

[Step n=5]

Both the main device 1 and the battery pack 2 determine the feasibility for update. The feasibility for update is determined by evaluating conditions such as whether the version of the firmware for update is newer than that of the firmware stored in battery pack 2 memory 24, and whether the battery pack 2 connected to the main device 1 is a genuine product. If it is determined that update is not possible, control proceeds to step 8 and firmware update is stopped. A method, where both the main device 1 and the battery pack 2 determine if update is possible, can safely update the firmware with a higher degree of reliability. However, this step is not always necessary.

[Step n=6]

Update data is transmitted from the main device 1 to the battery pack 2 control circuit 21 to update the firmware stored in the battery pack 2 control circuit 21 memory 24. Here, the battery pack 2 control circuit 21 is supplied with power from both the battery pack 2 rechargeable battery 20 and the AC adapter 3 through the main device 1. The main device 1 transmits encrypted firmware to the battery pack 2 to update the firmware stored in memory 24. A method that transmits encrypted firmware is effective for updating battery pack 2 firmware in a more secure manner.

[Step n=7]

After battery pack 2 firmware is updated, an update complete signal is output from the battery pack 2 to the main device 1. The main device 1 detects update completion and switches the battery pack 2 charging and discharging switches 230N. This re-establishes a state where discharge from the battery pack 2 to the main device 1 is possible, and battery charging is possible.

Figure 3:
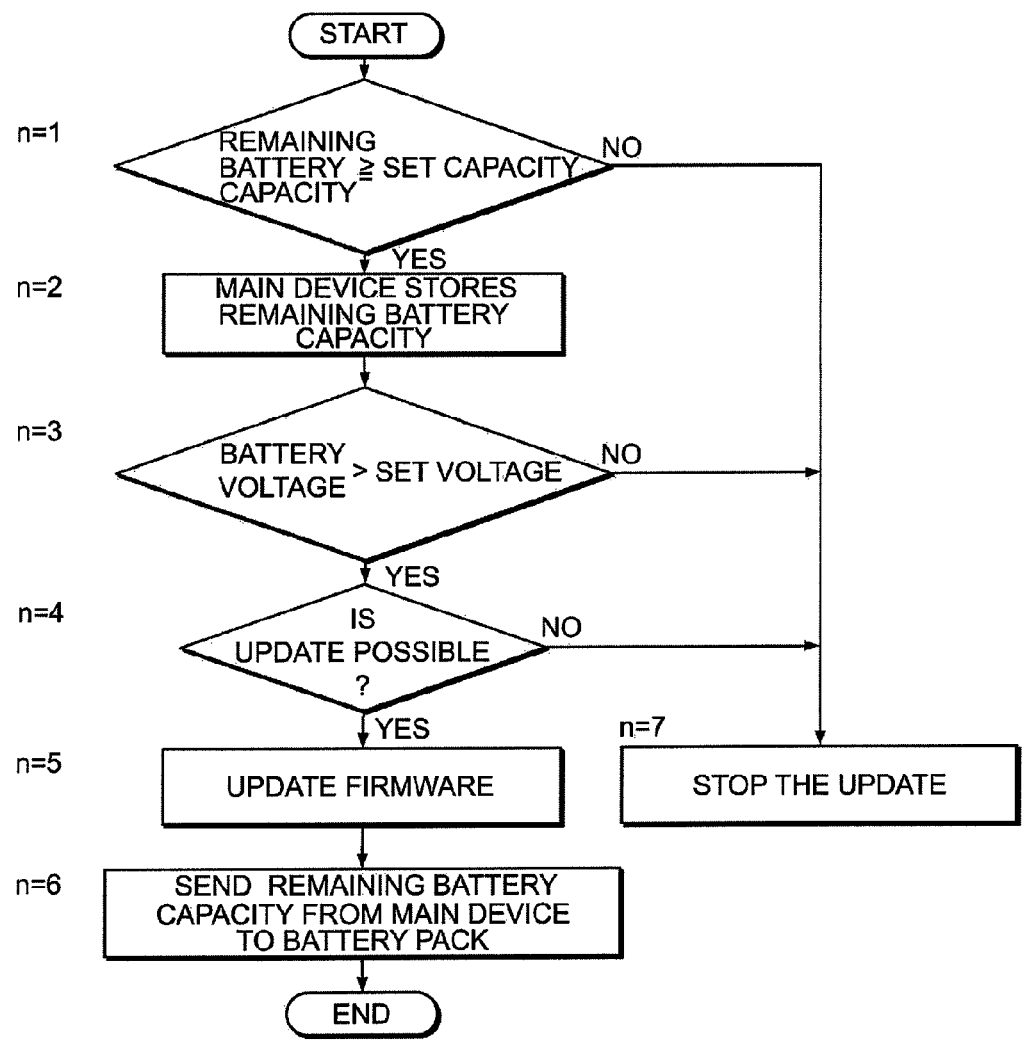
FIG. 3 is a flow-chart showing another embodiment of the battery pack updating method of the present invention.

The main device 1 notebook computer 10 can also rewrite the firmware with revised firmware by the following steps shown in FIG. 3.

[Step n=1]

The main device 1 compares battery pack 2 rechargeable battery 20 remaining capacity to a set capacity. If rechargeable battery 20 remaining capacity is less than the set capacity, control proceeds to step 7 and firmware update is stopped.

[Step n=2]

The main device 1 temporarily stores rechargeable battery 20 remaining capacity.

[Step n=3]

The battery pack 2 detects rechargeable battery 20 voltage and compares it to a set voltage. If rechargeable battery 20 voltage is less than or equal to the set voltage, control proceeds to step 7 and firmware update is stopped. An updating method that detects battery 20 voltage can update battery pack 2 firmware in an even safer manner. However, since rechargeable battery 20 voltage is essentially known from the remaining capacity, the feasibility for update can be determined by the remaining battery capacity detected at step n=1. Therefore, this step is not always necessary.

[Step n=4]

Both the main device 1 and the battery pack 2 determine the feasibility for update. The feasibility for update is determined by evaluating conditions such as whether the version of the firmware for update is newer than that of the firmware stored in battery pack 2 memory 24, and whether the battery pack 2 connected to the main device 1 is a genuine product. If it is determined that update is not possible, control proceeds to step 7 and firmware update is stopped. A method, where both the main device 1 and the battery pack 2 determine if update is possible, can safely update the firmware with a higher degree of reliability. However, this step is not always necessary.

[Step n=5]

Update data is transmitted from the main device 1 to the battery pack 2 control circuit 21 to update the firmware stored in the battery pack 2 control circuit 21 memory 24. Here, the battery pack 2 control circuit 21 is supplied with power from both the battery pack 2 rechargeable battery 20 and the AC adapter 3 through the main device 1. The main device 1 transmits encrypted firmware to the battery pack 2 to update the firmware stored in memory 24. A method that transmits encrypted firmware is effective for updating battery pack 2 firmware in a more secure manner.

[Step n=6]

After battery pack 2 firmware is updated, an update complete signal is output from the battery pack 2 to the main device 1. The main device 1 detects update completion and sends the remaining capacity to the battery pack 2. The battery pack 2 uses the remaining capacity sent from the main device 1 to set the rechargeable battery 20 remaining capacity.

Figure 4:
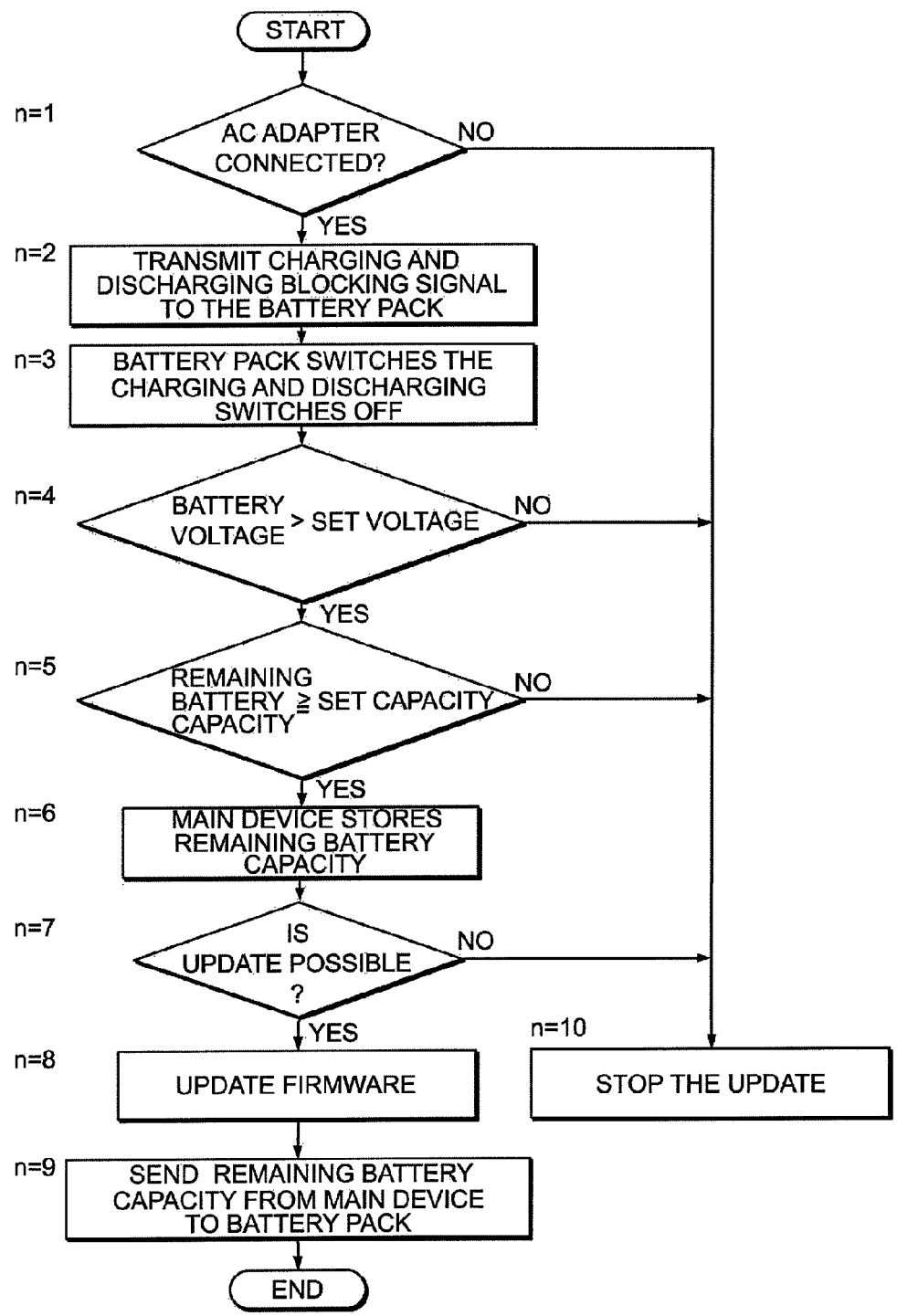
FIG. 4 is a flow-chart showing another embodiment of the battery pack updating method of the present invention.

Further, battery pack 2 firmware can also be updated by the following steps shown in FIG. 4.

[Step n=1]

The main device 1 confirms AC adapter 3 connection. If AC adapter 3 connection to the main device 1 cannot be confirmed, control proceeds to step 10 and firmware update is stopped.

[Step n=2]

If the main device 1 confirms AC adapter 3 connection, the main device 1 transmits a charging and discharging blocking signal to the battery pack 2 via the communication line 19.

[Step n=3]

The battery pack 2 detects the charging and discharging blocking signal and switches the charging and discharging switches 23 OFF. This establishes a state where discharge of the rechargeable battery 20 to the main device 1 is stopped, and battery pack 2 charging from the main device 1 is stopped.

[Step n=4]

The battery pack 2 detects rechargeable battery 20 voltage and compares it to a set voltage. If rechargeable battery 20 voltage is less than or equal to the set voltage, control proceeds to step 10 and firmware update is stopped.

[Step n=5]

The main device 1 compares battery pack 2 rechargeable battery 20 remaining capacity to a set capacity. If rechargeable battery 20 remaining capacity is less than the set capacity, control proceeds to step 10 and firmware update is stopped.

[Step n=6]

The main device 1 temporarily stores rechargeable battery 20 remaining capacity.

[Step n=7]

Both the main device 1 and the battery pack 2 determine the feasibility for update. The feasibility for update is determined by evaluating conditions such as whether the version of the firmware for update is newer than that of the firmware stored in battery pack 2 memory 24, and whether the battery pack 2 connected to the main device 1 is a genuine product. If it is determined that update is not possible, control proceeds to step 10 and firmware update is stopped. A method, where both the main device 1 and the battery pack 2 determine if update is possible, can safely update the firmware with a higher degree of reliability. However, this step is not always necessary.

[Step n=8]

Update data is transmitted from the main device 1 to the battery pack 2 control circuit 21 to update the firmware stored in the battery pack 2 control circuit 21 memory 24. Here, the battery pack 2 control circuit 21 is supplied with power from both the battery pack 2 rechargeable battery 20 and the AC adapter 3 through the main device 1. The main device 1 transmits encrypted firmware to the battery pack 2 to update the firmware stored in memory 24. A method that transmits encrypted firmware is effective for updating battery pack 2 firmware in a more secure manner.

[Step n=9]

After battery pack 2 firmware is updated, an update complete signal is output from the battery pack 2 to the main device 1. The main device 1 detects update completion and sends the remaining capacity to the battery pack 2. The battery pack 2 uses the remaining capacity sent from the main device 1 to set the rechargeable battery 20 remaining capacity. Further, the main device 1 detects update completion and switches the battery pack 2 charging and discharging switches 230N. This re-establishes a state where discharge from the battery pack 2 to the main device 1 is possible, and battery charging is possible.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-38085 filed in Japan on Feb. 20, 2009, the content of which is incorporated herein by reference.

What is claimed is:

1. A battery pack updating method that updates firmware stored in a rewritable manner in an internal control circuit memory upon an update signal transmitted from a main device that supplies power, the method comprising:
   connecting an AC adapter to the main device when a battery pack memory is updated, and while supplying power to the main device from the AC adapter, transmitting a charging and discharging blocking signal from the main device to a battery pack control circuit via a communication line to stop battery pack rechargeable battery discharge to the main device and rechargeable battery charging; and
   transmitting update data from the main device to the battery pack control circuit to update the memory while rechargeable battery discharge to the main device and charging from the main device are stopped by the charging and discharging blocking signal.

2. The battery pack updating method of claim 1, wherein power is supplied to the battery pack control circuit from both the rechargeable battery and the AC adapter when the battery pack memory firmware is updated.

3. The battery pack updating method of claim 1, wherein the battery pack is provided with charging and discharging switches connected in series with the rechargeable battery, a protection circuit is provided in the control circuit to control the charging and discharging switches, and the protection circuit controls the charging and discharging switches to control rechargeable battery charging and discharging.

4. The battery pack updating method of claim 1, wherein the main device transmits encrypted firmware to the battery pack to update the battery pack firmware.

5. The battery pack updating method of claim 1, wherein when the main device updates the battery pack firmware, both the main device and the battery pack judge whether the update is possible or not.

6. The battery pack updating method of claim 2, wherein when the main device updates the battery pack firmware, a battery pack rechargeable battery voltage is detected, and the update is started when the detected voltage is greater than a set voltage.

7. The battery pack updating method of claim 2, wherein when the main device updates the battery pack firmware, a battery pack rechargeable battery remaining capacity is detected, and the update is started when the remaining capacity is greater than a set capacity.

8. The battery pack updating method of claim 1, wherein when the main device updates the battery pack firmware, it is judged whether or not the AC adapter is connected to the main device, and the update is started when AC adapter connection is confirmed.

9. The battery pack updating method of claim 1, wherein the main device is a notebook computer.

10. The battery pack updating method of claim 1, wherein the battery pack rechargeable battery is a lithium ion battery.

11. The battery pack updating method of claim 1, further comprising:

Storing and saving a rechargeable battery remaining capacity when the battery pack memory is updated; and
rewriting a rechargeable battery remaining capacity with the stored and saved rechargeable battery remaining capacity.

12. The battery pack updating method of claim 11, wherein power is supplied to the battery pack control circuit from both the rechargeable battery and the AC adapter when the battery pack memory firmware is updated.

13. The battery pack updating method of claim 11, wherein the battery pack is provided with charging and discharging switches connected in series with the rechargeable battery, a protection circuit is provided in the control circuit to control the charging and discharging switches, and the protection circuit controls the charging and discharging switches to control rechargeable battery charging and discharging.

14. The battery pack updating method of claim 11, wherein the main device transmits encrypted firmware to the battery pack to update the battery pack firmware.

15. The battery pack updating method of claim 11, wherein when the main device updates the battery pack firmware, both the main device and the battery pack judge whether the update is possible or not.

16. The battery pack updating method of claim 11, wherein when the main device updates the battery pack firmware, battery pack rechargeable battery voltage is detected, and the update is started when the detected voltage is greater than a set voltage.

17. The battery pack updating method of claim 11, wherein when the main device updates the battery pack firmware, the battery pack rechargeable battery remaining capacity is detected, and the update is started when the remaining capacity is greater than a set capacity.

18. The battery pack updating method of claim 11, wherein when the main device updates the battery pack firmware, it is judged whether or not the AC adapter is connected to the main device, and the update is started when AC adapter connection is confirmed.

19. The battery pack updating method of claim 11, wherein the main device is a notebook computer.

20. The battery pack updating method of claim 11, wherein the battery pack rechargeable battery is a lithium ion battery.

* * * * *